United States Patent
Li

(10) Patent No.: US 8,832,979 B2
(45) Date of Patent: Sep. 16, 2014

(54) POSITIONING STRUCTURE FOR POSITIONING OPTICAL FILM AND FRAME AND RELATED BACKLIGHT MODULE AND LIQUID CRYSTAL DISPLAY

(71) Applicant: Shenzhen China Star Optoelectronics Technology Co., Ltd., Shenzhen, Guangdong (CN)

(72) Inventor: Quan Li, Shenzhen (CN)

(73) Assignee: Shenzhen China Star Optoelectronics Technology, Co., Ltd., Shenzhen, Guangdong (CN)

( * ) Notice: Subject to any disclaimer, the term of this patent is extended or adjusted under 35 U.S.C. 154(b) by 91 days.

(21) Appl. No.: 13/811,924

(22) PCT Filed: Jan. 10, 2013

(86) PCT No.: PCT/CN2013/070339
§ 371 (c)(1),
(2), (4) Date: Jan. 24, 2013

(87) PCT Pub. No.: WO2014/106355
PCT Pub. Date: Jul. 10, 2014

(65) Prior Publication Data
US 2014/0189982 A1    Jul. 10, 2014

(51) Int. Cl.
*G09F 13/18* (2006.01)
*F21V 8/00* (2006.01)
*A44B 99/00* (2010.01)
*H01F 7/02* (2006.01)
*G02F 1/1333* (2006.01)

(52) U.S. Cl.
CPC ............... *H01F 7/02* (2013.01); *G02B 6/0011* (2013.01); *A44B 99/00* (2013.01); *G02F 1/133308* (2013.01)

USPC .................................. 40/546; 40/711; 349/58

(58) Field of Classification Search
CPC ........... G02B 6/0091; G02F 1/133308; A47G 2001/0672
USPC ....................................... 40/546, 711; 349/58
See application file for complete search history.

(56) References Cited

U.S. PATENT DOCUMENTS

| | | | |
|---|---|---|---|
| 5,502,907 A * | 4/1996 | Wang | 40/711 |
| 7,219,460 B1 * | 5/2007 | Grayson | 40/711 |
| 2011/0187961 A1 * | 8/2011 | Jeong et al. | 349/58 |
| 2011/0260989 A1 * | 10/2011 | Tho et al. | 345/173 |
| 2013/0169900 A1 * | 7/2013 | Dighde | 349/43 |
| 2014/0125911 A1 * | 5/2014 | Lee | 349/58 |

* cited by examiner

*Primary Examiner* — Gary Hoge
(74) *Attorney, Agent, or Firm* — Andrew C. Cheng

(57) ABSTRACT

The present invention discloses a backlight module and an LCD having a positioning structure for fixing an optical film and a frame. The frame includes a side frame having an assembling hole. The optical film is placed on the side frame and includes a protruded ear having a positioning hole. The positioning structure includes: a magnetic member installed inside the assembling hole; an attracted member including a compression part and a positioning pillar, wherein the positioning pillar is connected to the compression part and gets inside the assembling hole through the positioning hole such that the positioning pillar is connected to an attraction hole due to a magnetic effect to make the compression part compress and fix the optical film on the side frame. The positioning structure can fix the optical film in X, Y, and Z directions to raise the positioning reliability, assembling speed, and capacity.

18 Claims, 3 Drawing Sheets

POSITIONING STRUCTURE FOR POSITIONING OPTICAL FILM AND FRAME AND RELATED BACKLIGHT MODULE AND LIQUID CRYSTAL DISPLAY

BACKGROUND OF THE INVENTION

1. Field of the Invention

The invention relates to a liquid crystal display, and more particularly, to a positioning structure for positioning an optical film and a frame and related backlight module and LCD.

2. Description of the Prior Art

A liquid crystal display (LCD) has many advantages. It has been widely used in all kinds of electronic devices.

In an LCD having a LED backlight module and a narrow side frame, in order to solve a hotspot problem formed on the light guiding plate, the optical film is often placed on the frame. Please refer to FIG. 1, which is a diagram showing a backlight module according to the related art. The backlight module 100 comprises at least one optical film 10, a plastic frame 20, a back frame 30, a light guiding plate 40, and a Led light source 50. The light guiding plate 40 is placed inside the back frame 30. The Led light source 50 is placed on an inner wall 31 of the back frame 30 and near a light input surface of the light guiding plate 40. The lights generated from the LED light source are inputted into the light guiding plate 40 through the light input surface. A reflection plate 60 is installed between the light guiding plate 40 and the back frame 30, and is used to reflect the lights emitted from the light guiding plate 40 back to the light guiding plate 40. The plastic frame 20 and the back frame 30 are assembled to fix the light guiding plate 40, the LED light source 50, and the reflection plate 60 inside the back frame 30. A positioning pillar 26 is installed on the side frame 25 of the plastic frame 20, and is used to be placed through the positioning hole 12 of the optical film 10. In this way, the optical film 10 can be fixed in both X and Y directions.

It can be seen that the plastic frame 20 and the optical film 10 cannot be fixed in the Z direction (the direction of the thickness of the backlight module 100). This makes the optical film 10 unstable in the Z direction.

SUMMARY OF THE INVENTION

It is therefore one of the primary objectives of the claimed invention to provide a positioning structure for fixing the optical film and the frame, to solve the above-mentioned problem.

According to an exemplary embodiment of the claimed invention, a positioning structure for fixing an optical film and a plastic frame is disclosed. The plastic frame comprises a side frame having an assembling hole. The optical film placed on the side frame and comprises a protruded ear. The protruded ear has a positioning hole. The positioning structure comprises: a magnetic member, installed inside the assembling hole; an attracted member, comprising a compression part and a positioning pillar, wherein the positioning pillar is connected to a lower surface of the compression part and gets inside the assembling hole through the positioning hole such that the positioning pillar is connected to an attraction hole of the magnetic member due to a magnetic effect to make the compression part compress and fix the optical film on the side frame.

According to another exemplary embodiment of the present invention, a backlight module is disclosed. The backlight module comprises a back frame; a light guiding plate, installed in the back frame; a plastic frame, comprising a side frame having an assembling hole, the plastic frame placed on the light guiding plate; a magnetic member, installed inside the assembling hole; an optical film, placing on the side frame and comprising a protruded ear, the protruded ear having a positioning hole; and an attracted member, comprising a compression part and a positioning pillar, wherein the positioning pillar is connected to a lower surface of the compression part and gets inside the assembling hole through the positioning hole such that the positioning pillar is connected to an attraction hole of the magnetic member due to a magnetic effect to make the compression part compress and fix the optical film on the side frame.

According to another exemplary embodiment of the present invention, a liquid crystal display is disclosed. The liquid crystal display comprises a backlight module, a display panel placed on the backlight module, a bezel placed on the display panel. The backlight module comprises a back frame; a light guiding plate, installed in the back frame; a plastic frame, comprising a side frame having an assembling hole, the plastic frame placed on the light guiding plate; a magnetic member, installed inside the assembling hole; an optical film, placing on the side frame and comprising a protruded ear, the protruded ear having a positioning hole; and an attracted member, comprising a compression part and a positioning pillar, wherein the positioning pillar is connected to a lower surface of the compression part and gets inside the assembling hole through the positioning hole such that the positioning pillar is connected to an attraction hole of the magnetic member due to a magnetic effect to make the compression part compress and fix the optical film on the side frame.

In one aspect of the present invention, the positioning pillar and the compression part are monolithic.

In another aspect of the present invention, the positioning pillar and the compression part are manufactured by a magnetic metal.

In another aspect of the present invention, a buffer layer is installed on an upper surface of the compression part, and the buffer layer is manufactured by a silica gel.

In still another aspect of the present invention, the magnetic member is connected to a lower surface of the positioning hole by sticky glue, and the sticky glue is acrylic resin.

In yet another aspect of the present invention, the magnetic member is a magnet.

In contrast to the related art, the present invention, the present invention positioning structure can fix the optical film well in all X, Y, and Z directions. Therefore, the present invention raises the reliability of positioning the optical film and makes assembly easier such that the assembling speed and capacity are raised.

DETAILED DESCRIPTION OF THE PREFERRED EMBODIMENT

In order to illustrate the technique and effects of the present invention, a detailed description will be disclosed by the following disclosure in conjunction with figures. Please note, the same components are labeled by the same number.

Figure 1:
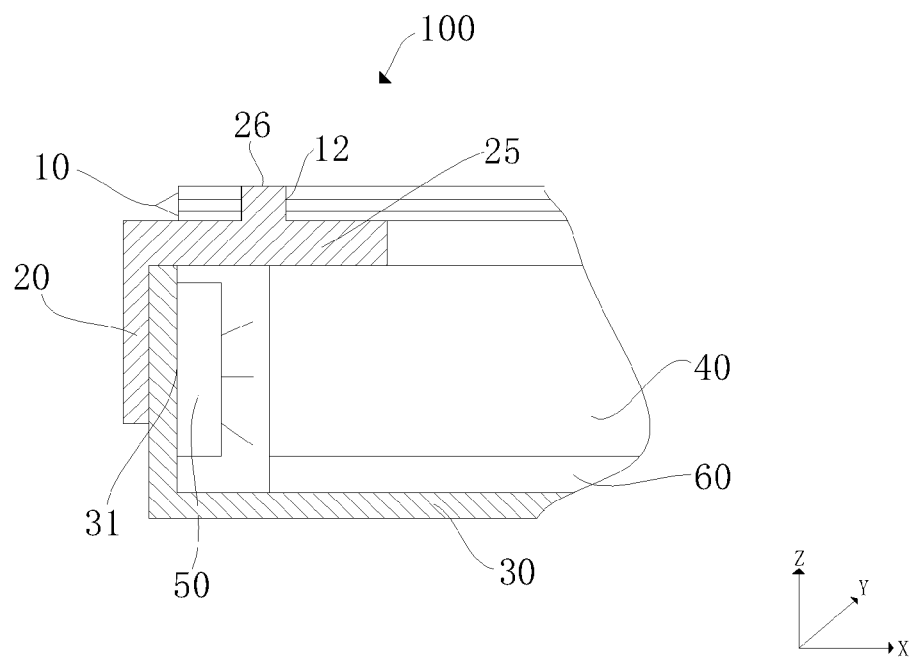
FIG. 1 is a diagram showing a backlight module according to the related art.
Figure 2:
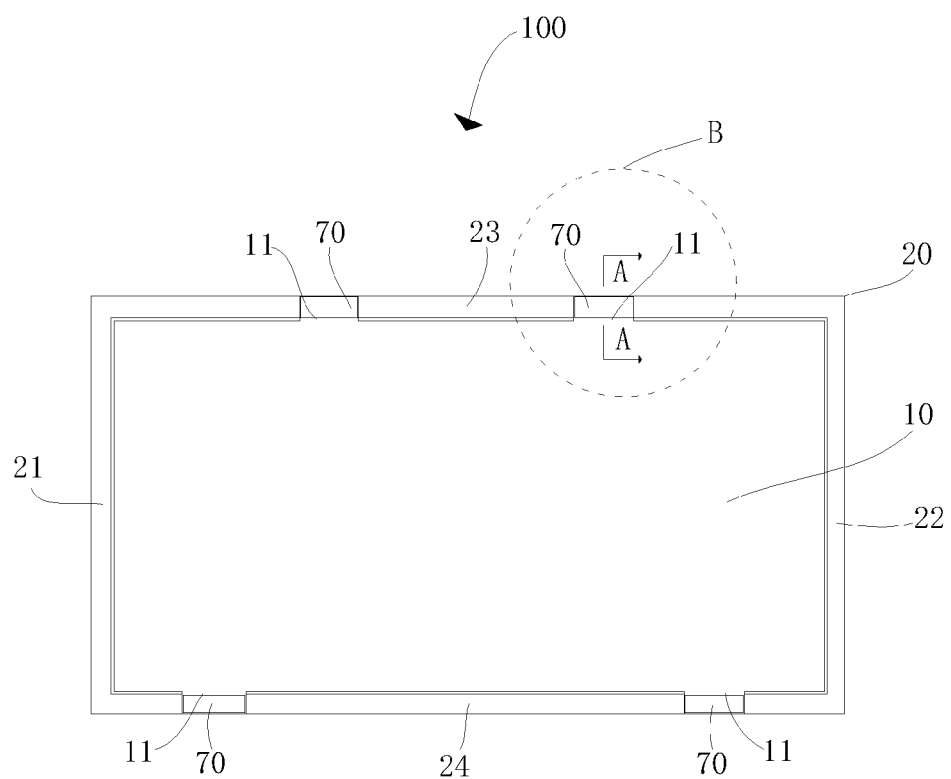
FIG. 2 is a diagram showing a backlight module according to an embodiment of the present invention.

Please refer to FIG. 2, which is a diagram showing a backlight module according to an embodiment of the present invention. As shown in FIG. 2, the backlight module 100 comprises a plastic frame 20 and at least one optical film 10, where the optical film 10 is installed on the frame.

Specifically, the plastic frame 20 is a rectangular frame and has four side frames 21, 22, 23, and 24. The first frame 21 and the second frame 22 are installed oppositely, and the third frame 23 and the fourth frame 24 are installed oppositely. Two adjacent frames are vertical to each other. These frames 21, 22, 23, and 24 have the same thickness. In this embodiment, the first frame 21 and the second frame 22 are short side frames of the plastic frame 20, and the third frame 23 and the fourth frame 24 are long side frames of the plastic frame 20. The four side frames 21, 22, 23, and 24 defines a placing area to place and load the optical film 10 and other parts of the backlight module 100. Please note, the present invention does not limit the shape of the plastic frame 20. That is, the rectangular frame is only regarded as an embodiment, not a limitation of the present invention. A frame having another shape can be utilized, and this still obeys the spirit of the present invention.

In this embodiment, a positioning structure 70 is installed on two side frames of the plastic frame 20, for example, the third side frame 23 and the fourth side frame 24, for fixing the optical film. For example, the third frame 23 has two positioning structures 70 and the fourth frame 24 has two positioning structures 70, too. Please note, in another embodiment, the present invention can only install one or more positioning structures 70 on only one of the side frames (ex: the first side frame 21) of the plastic frame 20. Or, the present invention can install one or more positioning structures 70 on three of the side frames (ex: the side frames 21, 22, and 23) of the plastic frame 20. In addition, the present invention can install one or more positioning structures 70 on all of the side frames of the plastic frame 20. These changes all obey the spirit of the present invention.

Correspondingly, one corresponding side of the optical film 10, which is corresponding to the side frame having the positioning structure 70, has a protruded ear 11. That is, the protruded ear 11 is corresponding to the positioning structure 70. Furthermore, the number of the protruded ears corresponds to the number of the positioning structures 70, and they are one-by-one corresponding. In order to illustrate easily, in the following disclosure, the positioning structure 70 in the region B and corresponding protruded ear 11 of the optical film 10 are used for illustration. Other positioning structures 70 and protruded ears 11 are similar, and will be omitted.

Figure 3:
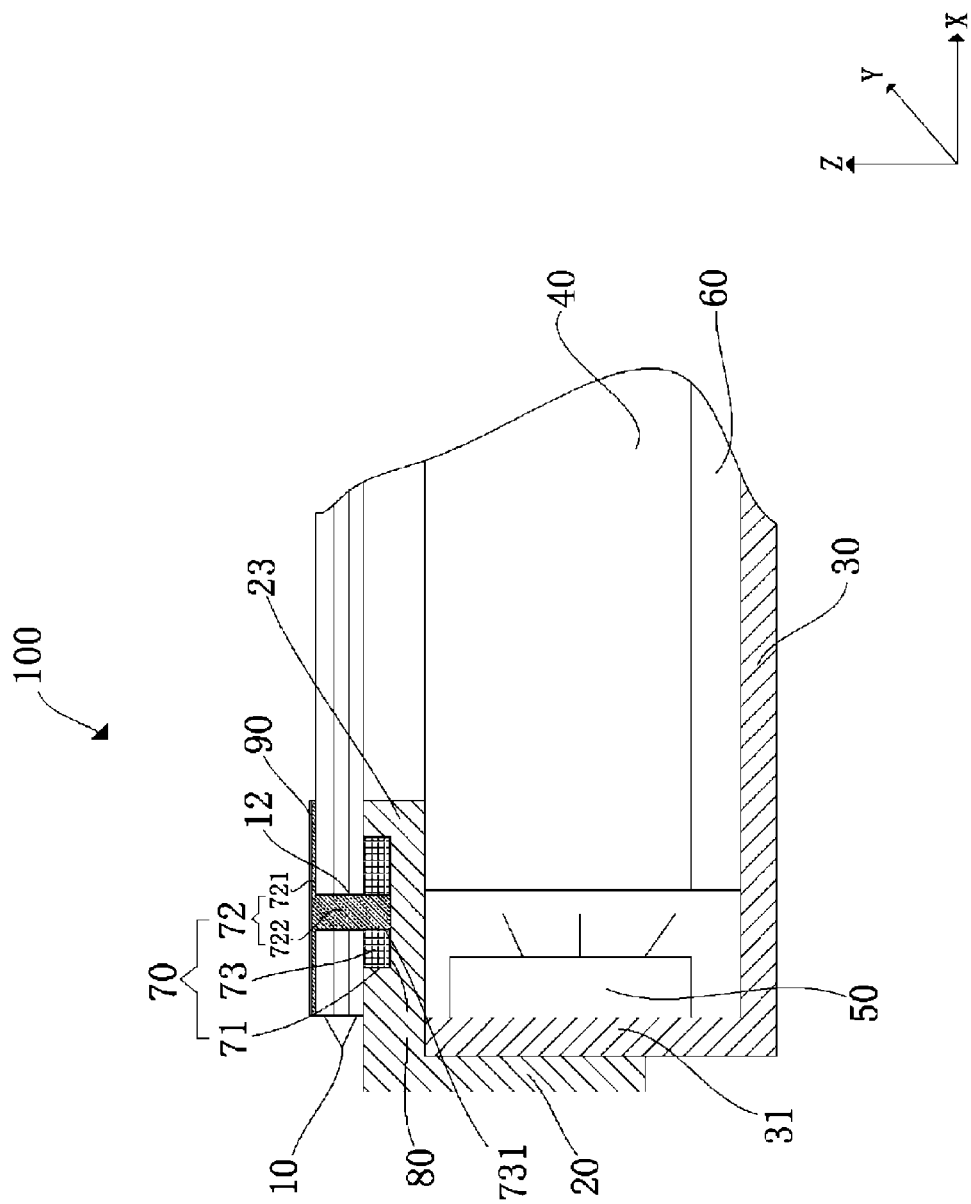
FIG. 3 is a diagram showing a region B along A-A direction shown in FIG. 2.

Please refer to FIG. 3 in conjunction with FIG. 2. FIG. 3 is a diagram showing a region B along A-A direction shown in FIG. 2. The backlight module 100 comprises at least one optical film 10, a plastic frame 20, a back frame 30, a light guiding plate 40, and a LED light source 50. The light guiding plate 40 is placed inside the back frame 30. The LED light source 50 is installed on an inner wall 31 of the back frame and near a light input surface of the light guiding plate 40. A refection plate 60 is installed between the light guiding plate 40 and the back frame 30, and is utilized for reflecting the lights emitted from the light guiding plate back to the light guiding plate 40. The plastic frame 20 and the back frame 30 are assembled to fix the light guiding plate 40, the LED light source 50, and the reflection plate 60 inside the back frame 30.

The positioning structure 70 is installed on the third side frame 23 of the frame. The positioning structure 70 comprises an assembling hole 71, an attracted member 72, and a magnetic member 73. The assembling hole 71 is installed on the third side frame 23, and the magnetic member 73 is placed inside the assembling hole 71. The magnetic member 73 comprises an attraction hole 731. The optical film 10 has a protruded ear 11. A positioning hole 12 is installed on the protruded ear 11. The attracted member 72 comprises a compression part 721 and a positioning pillar 722. The positioning pillar 722 is connected to the lower surface of the compression part 721. The shape of the positioning pillar 722 and the shape of the attraction hole 731 are matched. The positioning pillar 722 gets inside the assembling hole 71 through the positioning hole 12 such that the positioning pillar 722 is connected to the attraction hole 731 of the magnetic member 73 due to the magnetic effect to make the compression part 721 compress and fix the optical film 10 on the third side frame 23.

The positioning pillar 722 is connected to the lower surface of the compression part 721 by rivet or soldering procedure. Or, the positioning pillar 722 and the compression part 721 can be monolithic. The magnetic member 73 can be connected to the lower surface or the side surface of the assembling hole 71 by sticky glue 80. The sticky glue 80 can be an acrylic resin.

The magnetic member 73 can be manufactured by samarium-cobalt magnet, Neodymium magnet, or iron oxide magnet. The iron oxide magnet is often composed of powders of iron oxides, barium carbonate or strontium carbonate, and can be manufactured with a mould such that the shape and the size of it can be determined. Surely, the magnetic member 73 can be a rubber magnetic, which is a mixture of iron oxide magnet and rubber. The rubber magnetic is easy to make a magnetic having a specific shape and size. The attraction hole 731 of the magnetic member 73 can be a U-shape structure. Correspondingly, the cross-section of the positioning pillar 722 can be a rectangular or a specific shape which can match the U-shape structure of the attraction hole 731 such that the positioning pillar 722 and the magnetic member 73 can be better connected to each other. In addition, the shape of the magnetic member 73 can be a ring. This means that the shape of the attraction hole 731 is circular. Correspondingly, the cross-section of the positioning pillar can also be circular or a specific circular shape fitting the circular structure of the attraction hole 731 such that the positioning pillar 722 and the magnetic member 73 can be better connected to each other. Furthermore, the shape of the magnetic member 73 can be another shape as long as the shape of the cross-section of the positioning pillar 722 is well matched to make they are connected perfectly. These changes also obey the spirit of the present invention.

The attracted member 72 can be manufactured by a magnetic metal, such as a galvanized steel or stainless steel. When the positioning pillar 722 gets inside the assembling hole 71 through the positioning hole 12 of the optical film 10, the magnetic member 73 inside the positioning hole 71 and the positioning pillar 722 connected to the compression part 723 are attracted to each other due to the magnetic effects. Therefore, the compression part 723 compresses and fixes the optical film 10. Please note, the above-mentioned magnetic metal means a metal material which can generate a magnetic attraction force according to a nearby magnetic or magnetic member.

In this embodiment, a buffer layer 90 is installed on the upper surface of the compression 721 of the attracted member 72. The buffer layer 90 can be manufactured by a silica gel. The function of the buffer layer will be illustrated in the following disclosure.

Figure 4:
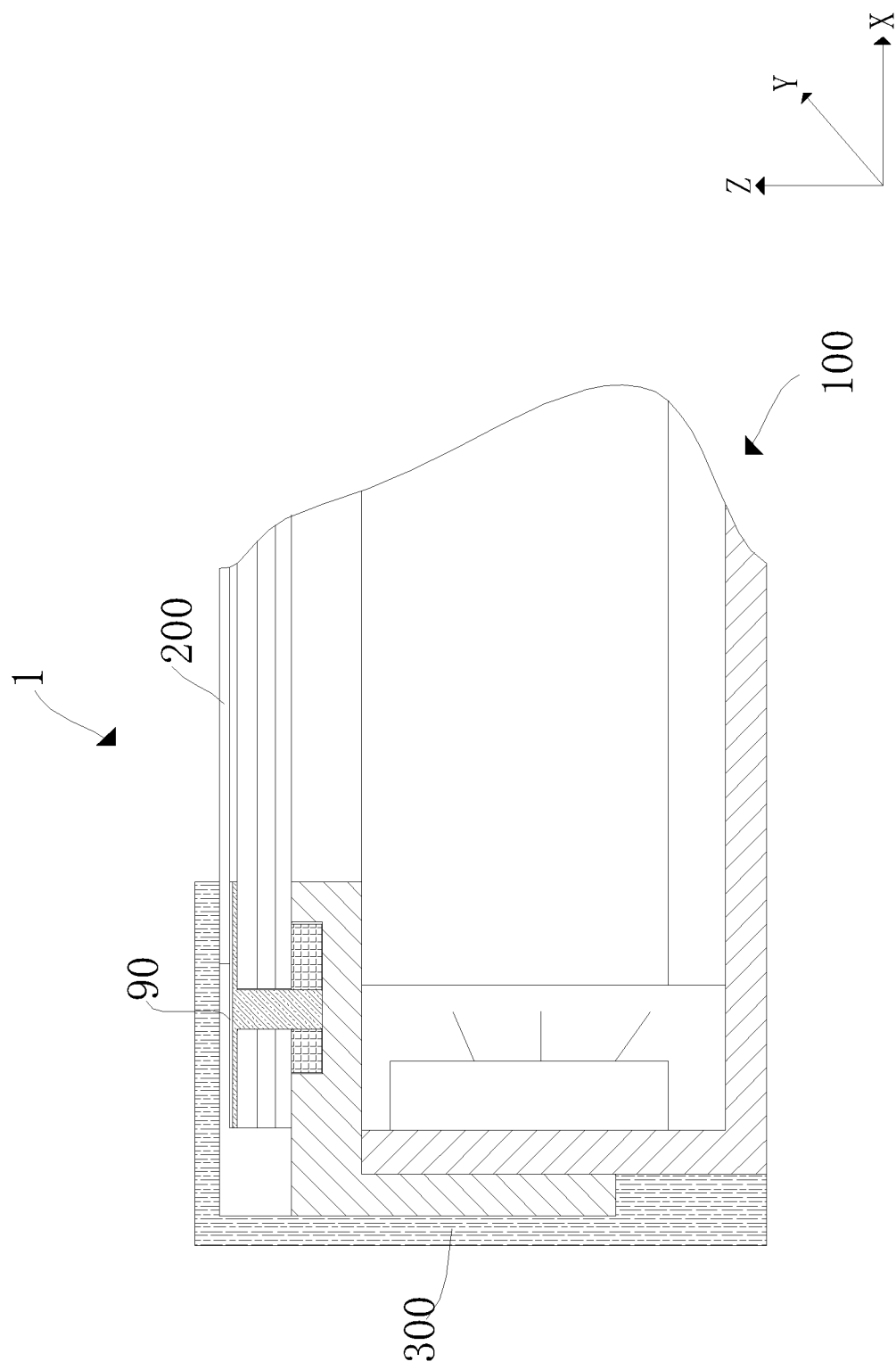
FIG. 4 is a diagram showing a structure of an LCD according to an embodiment of the present invention.

The backlight module of this embodiment is utilized in the LCD. Please refer to FIG. 4, which is a diagram showing an LCD according to an embodiment of the present invention. The LCD 1 comprises the above-mentioned backlight module 100, a display panel 200, and a frame 300. The display panel 200 is placed on the buffer layer 90 and placed oppositely to the backlight module 100. The backlight module 100 provides the lights to the display panel 200. The frame 300 covers the edges of the display panel 200 and is connected to the back frame 30. In this way, the display panel 200 and the backlight module 100 are assembled together to form a complete LCD 1.

The present invention positioning structure can fix the optical film in X, Y, and Z directions to raise the reliability of positioning and make it easier to assemble the LCD. This also raises the assembling speed and the capacity.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A positioning structure for fixing an optical film and a plastic frame, the plastic frame comprising a side frame having an assembling hole, the optical film placed on the side frame and comprising a protruded ear, the protruded ear having a positioning hole, the positioning structure comprising:
   a magnetic member, installed inside the assembling hole; and
   an attracted member, comprising a compression part and a positioning pillar, wherein the positioning pillar is connected to a lower surface of the compression part and gets inside the assembling hole through the positioning hole such that the positioning pillar is connected to an attraction hole of the magnetic member due to a magnetic effect to make the compression part compress and fix the optical film on the side frame.

2. The positioning structure of claim 1, wherein the positioning pillar and the compression part are monolithic.

3. The positioning structure of claim 1, wherein the positioning pillar and the compression part are manufactured by a magnetic metal.

4. The positioning structure of claim 1, wherein a buffer layer is installed on an upper surface of the compression part, and the buffer layer is manufactured by a silica gel.

5. The positioning structure of claim 1, wherein the magnetic member is connected to a lower surface of the positioning hole by sticky glue, and the sticky glue is acrylic resin.

6. The positioning structure of claim 1, wherein the magnetic member is a magnet.

7. A backlight module, comprising:
   a back frame;
   a light guiding plate, installed in the back frame;
   a plastic frame, comprising a side frame having an assembling hole, the plastic frame placed on the light guiding plate;
   a magnetic member, installed inside the assembling hole;
   an optical film, placing on the side frame and comprising a protruded ear, the protruded ear having a positioning hole; and
   an attracted member, comprising a compression part and a positioning pillar, wherein the positioning pillar is connected to a lower surface of the compression part and gets inside the assembling hole through the positioning hole such that the positioning pillar is connected to an attraction hole of the magnetic member due to a magnetic effect to make the compression part compress and fix the optical film on the side frame.

8. The backlight module of claim 7, wherein the positioning pillar and the compression part are monolithic.

9. The backlight module of claim 7, wherein the positioning pillar and the compression part are manufactured by a magnetic metal.

10. The backlight module of claim 7, wherein a buffer layer is installed on an upper surface of the compression part, and the buffer layer is manufactured by a silica gel.

11. The backlight module of claim 7, wherein the magnetic member is connected to a lower surface of the positioning hole by sticky glue, and the sticky glue is acrylic resin.

12. The backlight module of claim 7, wherein the magnetic member is a magnet.

13. A liquid crystal display, comprising: a backlight module, a display panel placed on the backlight module, a bezel placed on the display panel, wherein the backlight module comprises:
   a back frame;
   a light guiding plate, installed in the back frame;
   a plastic frame, comprising a side frame having an assembling hole, the plastic frame placed on the light guiding plate;
   a magnetic member, installed inside the assembling hole;
   an optical film, placing on the side frame and comprising a protruded ear, the protruded ear having a positioning hole; and
   an attracted member, comprising a compression part and a positioning pillar, wherein the positioning pillar is connected to a lower surface of the compression part and gets inside the assembling hole through the positioning hole such that the positioning pillar is connected to an attraction hole of the magnetic member due to a magnetic effect to make the compression part compress and fix the optical film on the side frame.

14. The liquid crystal display of claim 13, wherein the positioning pillar and the compression part are monolithic.

15. The liquid crystal display of claim 13, wherein the positioning pillar and the compression part are manufactured by a magnetic metal.

16. The liquid crystal display of claim 13, wherein a buffer layer is installed on an upper surface of the compression part, and the buffer layer is manufactured by a silica gel.

17. The liquid crystal display of claim 13, wherein the magnetic member is connected to a lower surface of the positioning hole by sticky glue, and the sticky glue is acrylic resin.

18. The liquid crystal display of claim 13, wherein the magnetic member is a magnet.

* * * * *